(12) United States Patent
Klappert et al.

(10) Patent No.: US 9,134,790 B2
(45) Date of Patent: Sep. 15, 2015

(54) METHODS AND SYSTEMS FOR RECTIFYING THE LENGTHS OF MEDIA PLAYLISTS BASED ON TIME CRITERIA

(71) Applicants: Walter R. Klappert, Los Angeles, CA (US); Mycal Elliott, Chicago, IL (US); Justin Wear, Philadelphia, PA (US)

(72) Inventors: Walter R. Klappert, Los Angeles, CA (US); Mycal Elliott, Chicago, IL (US); Justin Wear, Philadelphia, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 174 days.

(21) Appl. No.: 13/799,344

(22) Filed: Mar. 13, 2013

(65) Prior Publication Data

US 2014/0281973 A1 Sep. 18, 2014

(51) Int. Cl.
*G06F 3/00* (2006.01)
*G06F 3/01* (2006.01)
*G06F 17/30* (2006.01)

(52) U.S. Cl.
CPC ............ *G06F 3/01* (2013.01); *G06F 17/30053* (2013.01)

(58) Field of Classification Search
CPC ................................................. G06F 17/30053
USPC ......................................... 715/716, 810, 811
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward, III et al. | |
| 7,165,098 B1 | 1/2007 | Boyer et al. | |
| 7,432,940 B2 * | 10/2008 | Brook et al. | 345/629 |
| 7,761,892 B2 | 7/2010 | Ellis et al. | |
| 8,046,801 B2 | 10/2011 | Ellis et al. | |
| 8,102,987 B2 * | 1/2012 | Agapi et al. | 379/215.01 |
| 8,156,435 B2 * | 4/2012 | Wohlert | 715/716 |
| 8,219,536 B2 * | 7/2012 | Wohlert | 707/694 |
| 8,239,410 B2 * | 8/2012 | Shahraray et al. | 707/784 |
| 8,489,990 B2 * | 7/2013 | Radloff et al. | 715/721 |
| 2002/0174430 A1 | 11/2002 | Ellis et al. | |
| 2003/0110499 A1 | 6/2003 | Knudson et al. | |
| 2005/0251827 A1 | 11/2005 | Ellis et al. | |
| 2006/0267995 A1 * | 11/2006 | Radloff et al. | 345/530 |
| 2009/0006479 A1 * | 1/2009 | Fujita et al. | 707/104.1 |
| 2010/0153885 A1 | 6/2010 | Yates | |
| 2014/0281971 A1 | 9/2014 | Isbell, III et al. | |
| 2014/0281972 A1 | 9/2014 | Kramer et al. | |

FOREIGN PATENT DOCUMENTS

WO WO-2005112312 A1 11/2005

* cited by examiner

*Primary Examiner* — William Titcomb
(74) *Attorney, Agent, or Firm* — Ropes & Gray LLP

(57) ABSTRACT

Methods and systems are described for generating and updating media playlists in response to playback alteration operations performed by a user. For example, a media guidance application may generate a media playlist accessible during a set time period (e.g., from 7:00 PM to 8:00 PM), which has a one hour play length. If a playback alteration operation (e.g., a pause or fast-forward operation) occurs during the playback of the media playlist, the media guidance application updates (e.g., by adding or removing content) the media playlist such that the media playlist has a play length that concludes by the end of the set time period (e.g., 8:00 PM).

20 Claims, 5 Drawing Sheets

METHODS AND SYSTEMS FOR RECTIFYING THE LENGTHS OF MEDIA PLAYLISTS BASED ON TIME CRITERIA

BACKGROUND

People commonly access playlists of media content at particular time periods in a day. For example, a user may access a half-an-hour media playlist for use during his or her half-an-hour lunch break. Moreover, in some cases, a user is free to modify (e.g., pause, fast-forward, etc.) the playback of the playlist. However, while a user may freely modify the playback of the media playlist, modifying the playback (e.g., pausing the playback) may cause the playlist to no longer correspond to the particular time period (e.g., the lunch break). For example, pausing the playback of a half-an-hour media playlist during the half-an-hour lunch break of the user may cause the media playlist to run over half-an-hour and cause the user to miss the end of the playlist.

SUMMARY

Accordingly, methods and systems are described herein for quickly and efficiently generating and updating media playlists in response to playback alteration operations performed by a user. For example, a media guidance application may generate a media playlist accessible during a set time period (e.g., from 7:00 PM to 8:00 PM), which has a one hour play length. If a playback alteration operation (e.g., a pause or fast-forward operation) occurs during the playback of the media playlist, the media guidance application updates (e.g., by adding or removing content) the media playlist such that the media playlist has a play length that concludes by the end of the set time period (e.g., 8:00 PM).

For example, each morning a user may wish to receive a thirty minute summary of all news about a certain topic. The media guidance application may, therefore, search various sources and compile a thirty minute playlist composed of media assets about the topic from the various sources. To create only a thirty minute playlist, the media guidance application may crop various segments, scenes, or sections of the media assets. Furthermore, during the playback of the playlist, the user may pause (e.g., to answer a phone) or fast-forward (e.g., to skip information the user already knows) the playback of the playlist. Due to the pause or fast-forward, the end of the playlist may no longer be thirty minutes after the user began accessing the playlist. Therefore, the media guidance application updates the playlist (e.g., by further cropping the media assets, adding new media assets, etc.) to ensure the end of the playlist may no longer be thirty minutes after the user began accessing the playlist.

In some embodiments, the media guidance application determines a time period for presenting media to a user and generates a first media playlist with a first play length corresponding to a length of time of the determined time period. In response to a playback alteration operation during the first media playlist that alters the first play length, the media guidance application generates a second media playlist with a second play length corresponding to a length of time between a time associated with the completion of the playback alteration operation and an end time of the determined time period.

In some embodiments, the media guidance application determines a content criterion and selects a media asset to be presented during the first media playlist based on content associated with the media asset corresponding to the content criterion. For example, the media guidance application may generate a media playlist corresponding to a particular topic requested by a user.

In some embodiments, when generating a first media playlist, the media guidance application may determine a length of time of the time period and determine play lengths for each of a plurality of media assets. The media guidance application may then select a subset of the plurality of media assets in which a sum of the play lengths associated with each media asset in the subset corresponds to the length of time of the determined time period. For example, to fill a thirty minute playlist, the media guidance application may select several media assets that have a combined play length of thirty minutes.

In some embodiments, when generating a second media playlist, the media guidance application may determine a length of time between a time associated with the completion of the playback alteration operation and an end time of the time period and determine play lengths for each of a plurality of media assets. The media guidance application may then select a subset of the plurality of media assets in which a sum of the play lengths associated for each media asset in the subset corresponds to the length of time between the time associated with the completion of the playback alteration operation and the end time of the determined time period. For example, to fill the amount of time remaining of an initial thirty minute playlist, the media guidance application may select several media assets that have a combined play length of the time remaining.

In some embodiments, when generating a second media playlist, the media guidance application may also base the selection and/or ordering of a media asset for the second playlist on whether or not the media asset was presented in the first media playlist. For example, if a media asset was presented in the first media asset, the media guidance application may not include that media asset in the second media playlist. Alternatively or additionally, if the completion of the playback alteration operation occurred during the playback of a particular media asset in the first media playlist (e.g., a user fast-forwarded to a particular media asset), the second media playlist may include and/or begin with the same media asset.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF DRAWINGS

Figure 1:
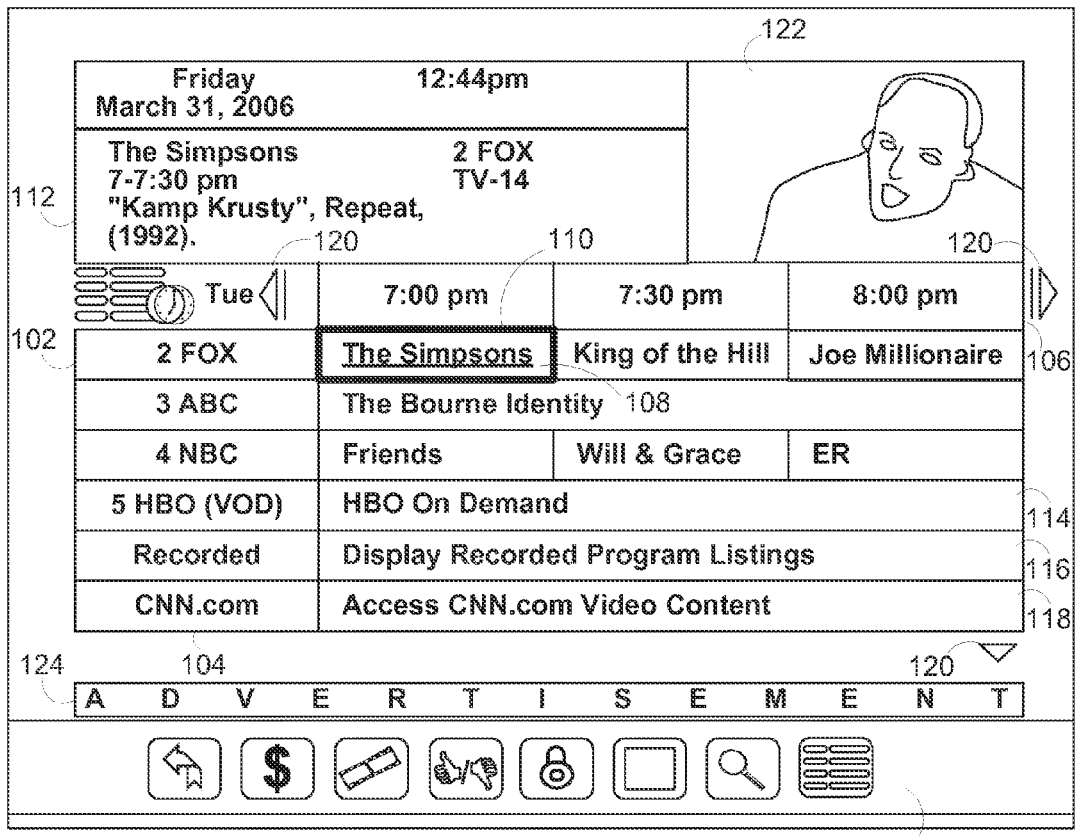
FIG. 1 shows an illustrative example of a media guidance application in accordance with some embodiments of the disclosure.

The amount of content available to users in any given content delivery system can be substantial. Consequently, many users desire a form of media guidance through an interface that allows users to efficiently navigate content selections, easily identify content that they may desire, and present the content in a playlist. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

As described herein, a media guidance application may generate media playlists featuring media guidance data and media assets for presentation to a user. Specifically, the media guidance application generates and updates a media playlists in response to playback alteration operations performed by a user. For example, a media guidance application may generate a first media playlist to access during a set time period (e.g., from 7:00 PM to 8:00 PM), which has a one hour play length. If a playback alteration operation (e.g., a pause or fast-forward operation) occurs during the playback of the media playlist, the media guidance application generates (e.g., by adding or removing content) a second media playlist that has a play length that concludes by the end of the set time period.

As used herein, the phrase "playback alteration operation" refers to any operation, which affects the rate of playback of a media asset. For example, any operation that pertains to playing back a non-linear media asset faster or slower than normal playback speed or in a different order than the media asset is designed to be played, such as a pause, slow-motion, fast-forward, rewind, skip, chapter selection, segment selection, skip segment, jump segment, next segment, previous segment, skip advertisement or commercial, next chapter, previous chapter or any other operation that does not play back the media asset at normal playback speed. The playback alteration operation may be any playback operation that is not "play," where the play operation plays back the media asset at normal playback speed.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens.

In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase, "media guidance data" or "guidance data" should be understood to mean any data related to content, such as media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
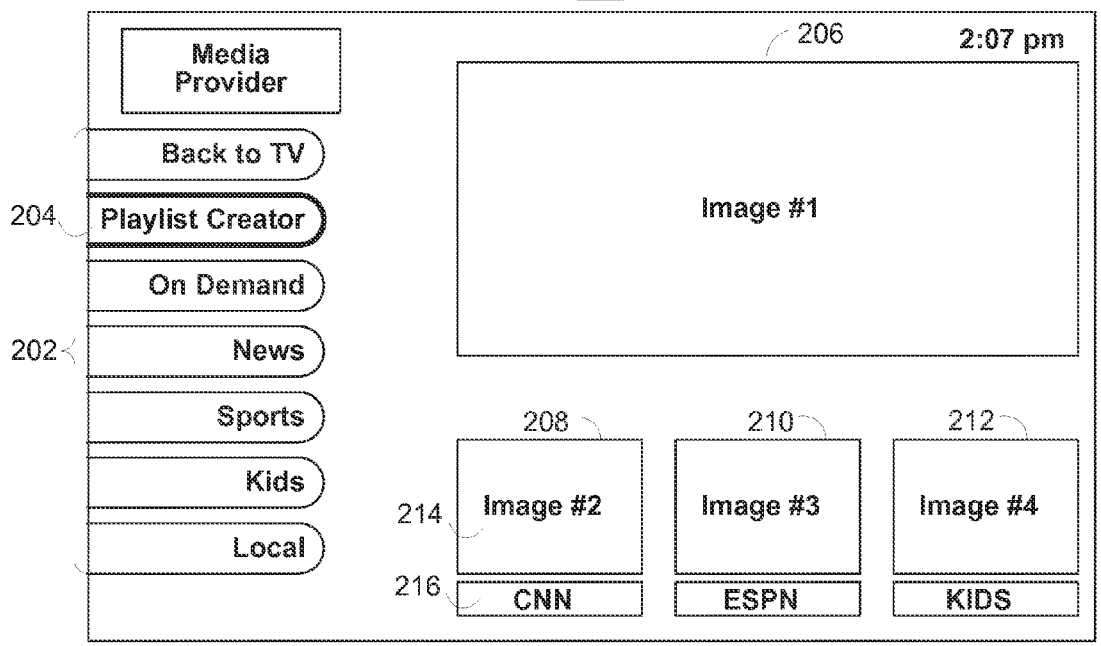
FIG. 2 shows another illustrative example of a media guidance application in accordance with some embodiments of the disclosure.
Figure 5:
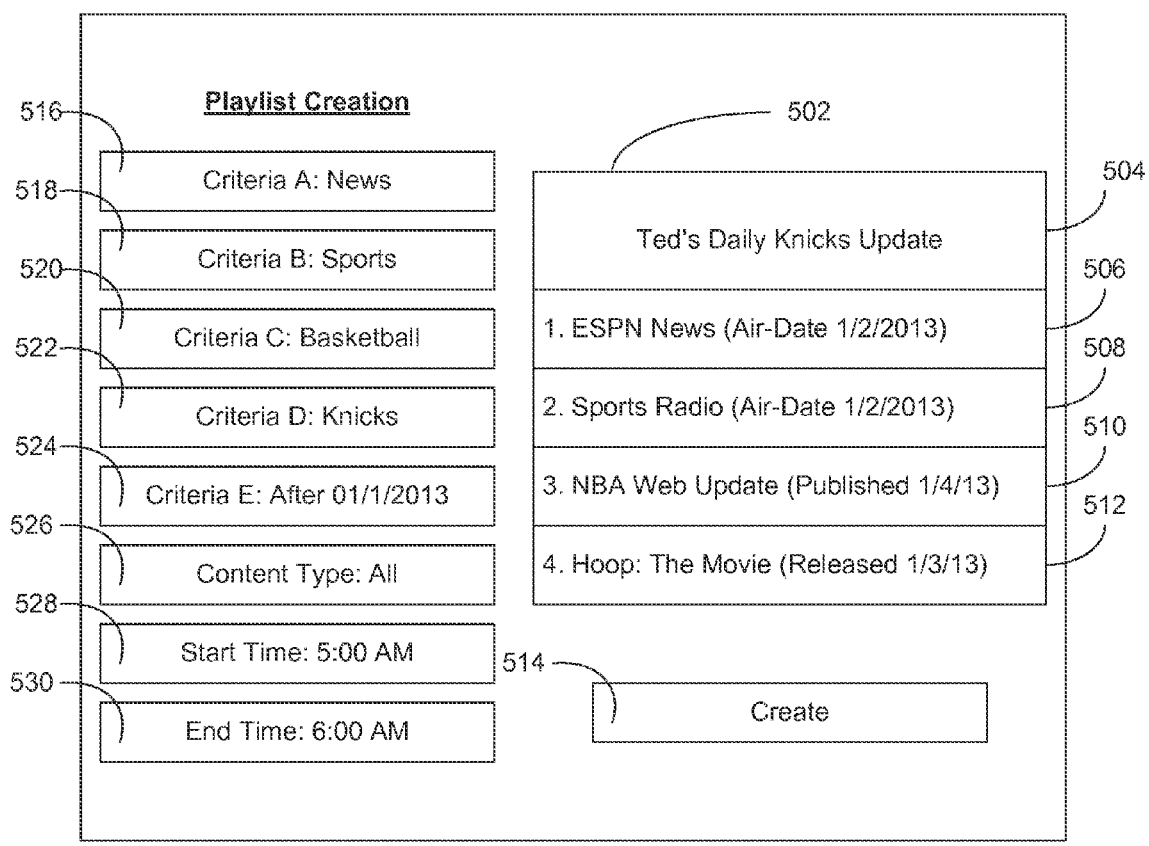
FIG. 5 shows an illustrative example of a media playlist creation display in a media guidance application in accordance with some embodiments of the disclosure.

FIGS. 1-2 show illustrative display screens that may be used to provide media guidance data. The display screens shown in FIGS. 1, 2, and 5 may be implemented on any suitable user equipment device or platform. While the displays of FIGS. 1, 2, and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria. The organization of the media guidance data is determined by guidance application data. As referred to herein, the phrase, "guidance application data" should be understood to mean data used in operating the guidance application, such as program information, guidance application settings, user preferences, or user profile information.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, selectable option 204 is selected. Selectable option 204 corresponds to a playlist creation option. For example, the media guidance application may generate display 500 (FIG. 5) in response to the selection of selectable option 204. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listings 208, 210, and 212 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
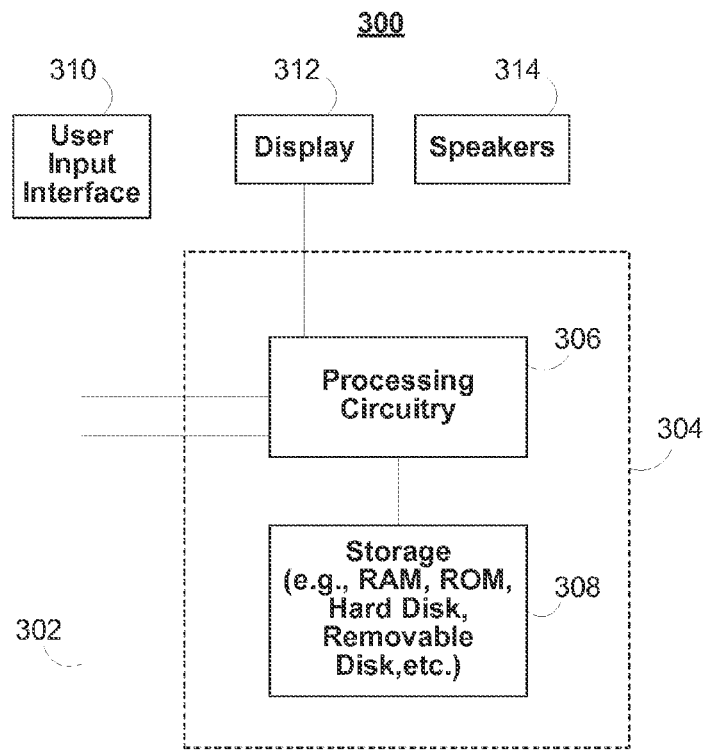
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance information, described above, and guidance application data, described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally, and data for use by the application is downloaded on a periodic basis (e.g., from an out-of-band feed, from an Internet resource, or using another suitable approach). In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
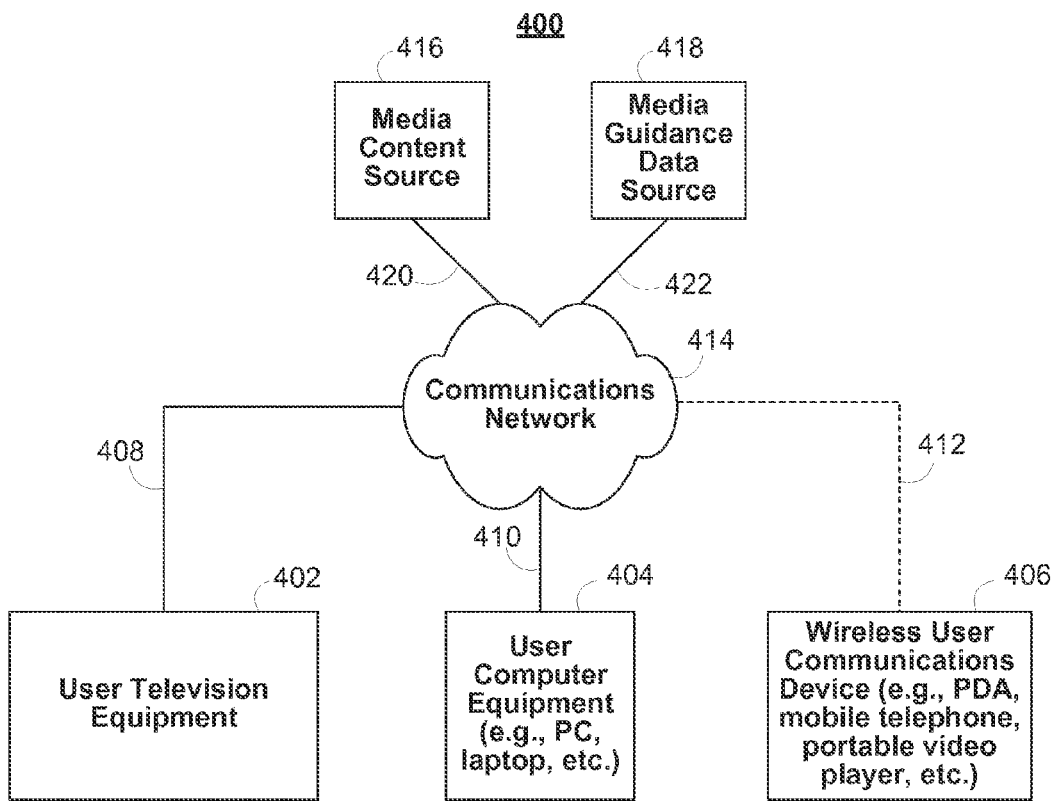
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 416 may be the originator of content (e.g., a television broadcaster, a Webcast provider, etc.) or may not be the originator of content (e.g., an on-demand content provider, an Internet provider of content of broadcast programs for downloading, etc.). Media content source 416 may include cable sources, satellite providers, on-demand providers, Internet providers, over-the-top content providers, or other providers of content. Media content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance application data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, standalone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

FIG. 5 shows an illustrative example of a media playlist creation display in a media guidance application. For example, display 500 may represent an interface used by a user to create, transfer, store, retrieve, and/or modify a playlist. Display 500 may appear on one or more user devices (e.g., any of the devices listed in FIGS. 3-4 below). Moreover, the media application may use one or more steps from one or more of the processes described in FIGS. 6-7 below to generated display 500 or any of the features described therein.

FIG. 5 includes display 500. Display 500 may appear on a display device (e.g., user equipment devices 402, 404, and/or 406 (FIG. 4) above). Furthermore, control circuitry 304 as described above in relation to FIG. 3 may be used to generate display 500. Display 500 includes playlist 502. Playlist 502 includes media assets 506, 508, 510, and 512. In some embodiments, media assets 506, 508, 510, and 512 may correspond to media assets received from several sources (e.g., media content source 414, user equipment devices 402, 404, and/or 406, and/or any device accessible from communications network 414 (FIG. 4)). For example, media asset 506, may represent a broadcast television show. Media asset 508 may represent a broadcasted radio program. Media asset 510 may represent a posting on a website, and media asset 512 may represent a VOD offering.

Playlist 502 also includes title display 504. For example, title display 504 may be used by a user to create, transfer, store, retrieve, and/or modify the playlist or the media assets in the playlist. In some embodiments, the media guidance application may retrieve playlist 502, and any media assets included in playlist 502 from local (e.g., storage 308 (FIG. 3)) or remote (e.g., media content source 416 (FIG. 4)) storage.

Display 500 also includes numerous options for creating a playlist (e.g., playlist 502). For example, playlist 502 is created (e.g., via a user input of create option 514) in response to values entered (e.g., via user input interface 310 (FIG. 3)) into criteria options 516, 518, 520, 522, and 524. For example, criteria option 516 indicates that playlist 502 will relate to "News." Criteria option 518 indicates that playlist 502 will relate to "Sports." Criteria option 520 indicates that playlist 502 will relate to "Basketball." Criteria option 522 indicates that playlist 502 will relate to "Knicks," and criteria option 524 indicates that playlist 502 will relate to content "After 01/1/2013." In response, the media guidance application searches (e.g., as discussed below in relation to FIG. 7) for content related to news about the New York Knicks basketball team that was received after Jan. 1, 2013 and populates playlist 502 (e.g., as described in relation to FIG. 7 below) with media assets related to that content.

The media guidance application may include numerous options for searching and presenting media assets. For example, the media guidance application may include options (e.g., content type option 526) for indicating a type of content (e.g., audio, video, image, textual data, etc.) that should be used to populate playlist 502. For example, content type option 526 currently indicates "All" resulting in the playlist being populated with video (media assets 506 and media asset 512), audio (media asset 508), and textual data (media asset 510).

It should be noted that in the case of a media asset without a defined play length (e.g., a textual article posted on a website), the media guidance application may determine a play length. For example, the media guidance application may determine (e.g., via control circuitry 304 (FIG. 3)) an amount of time (e.g., twenty seconds) that the media asset (e.g., media asset 510) should be presented in playlist 502. In some embodiments, the media guidance application may base the determined play length on the length of time a user (e.g., as indicated in a user profile stored on storage 308 (FIG. 3) of media guidance data source 418 (FIG. 4)) needs to view the media asset.

Display 500 also includes an option for indicating a time period associated with presenting playlist 502. For example, start time option 528 indicates that playlist 502 begins at 5:00 AM, and end time option 530 indicates that playlist 502 ends at 6:00 AM. In some embodiments, the media guidance application may further receive an indicator of a particular day, week, and/or month for presenting (or not presenting) the playlist. For example, the media guidance application may present a playlist of home videos on the birthday of a user. In another example, the media guidance application may present a playlist on weekdays only.

In some embodiments, the media guidance application may allow a user to further define a date range for media assets appearing in playlist 502. For example, criteria option 524 indicates that playlist 502 will relate to content "After 01/1/2013." In some embodiments, criteria option 524 may further be used to designate a date range of content that should be used to populate playlist 502. For example, the media guidance application may generate a media playlist of media assets concerning a particular topic that occurred in the past week.

In some embodiments, the media guidance application may generate a playlist (e.g., playlist 502), which includes media assets matching one or more criteria (e.g., criteria options 516, 518, 520, 522, and 524). For example, a given media playlist may include media assets that each correspond to all the criteria. Additionally or alternatively, a given playlist may include media assets that each correspond to at least one criteria (e.g., criteria options 516, 518, 520, 522, or 524).

In some embodiments, the media guidance application may rank all available media assets according to the number of criteria (e.g., criteria options 516, 518, 520, 522, and 524) to which each media asset corresponds. For example, the media assets selected by the media guidance application for inclusion in the media playlist (e.g., playlist 502) may represent the media assets with the highest ranking (e.g., corresponded to the most number of criteria).

In some embodiments, the media guidance application may rank more current (i.e. media assets that were broadcasted/released/published closest to the current date) higher. For example, all other criteria being equal, the media guidance application may rank a live broadcast of a media asset over a media asset broadcasted a week earlier. In some embodiments, the media guidance application may further display the ranking of each media asset to the user.

In some embodiments, the media guidance application may further assign a quality to each available media asset. For example, the quality of the media asset may correspond to the popularity or rating of the media asset (e.g., as determined by comments received via social media, industrial rating services, real-time surveys, etc.). In some embodiments, the quality of the media asset may further correspond to length of time of the play length of each media asset that corresponds to the criteria.

As described below, in some embodiments, the media guidance application may crop media assets to ensure that the media assets selected for the playlist conform to a specific play length. In such cases, the media asset that is cropped and the amount of time that is cropped from that media asset may depend on the quality of the media asset. For example, the media guidance application may determine to crop a media asset with a high quality very little, but determine to crop a media asset with a low quality substantially more. In some embodiments, the media guidance application may notify a user (e.g., via an on-screen prompt) before cropping one or more media assets.

In some embodiments, the media guidance application may also insert locally stored or pre-render buffer content. For example, if the media guidance application cannot locate enough media assets (or media assets with enough play length) to fill the entire media playlist, the media guidance application may insert pre-rendered videos or images received/retrieved from a user device (e.g., user equipment device 402, 404, and/or 406 (FIG. 4)) or a remote location (e.g., content source 416 and/or media guidance data source 418 (FIG. 4)). In some embodiments, the media guidance application may notify a user (e.g., via an on-screen prompt) of the lack of available media assets meeting the criteria and provide options as to whether buffer content should be included or the play length of the media playlist should be shortened.

In some embodiments, display 500, or a portion of display 500, may appear with the presentation of media assets 504, 506, 508, 510, and 512. For example, while the playlist is presented to a user, display 500 may appear as an overlay on a display screen of a user device (e.g., user equipment device 402, 404, and/or 406 (FIG. 4)). Additionally or alternatively, display 500 may appear as a pop-up upon receipt of a user input (e.g., via user input interface 304 (FIG. 3)).

In some embodiments, the features of display 500 may differ depending on whether or not the playlist is currently being presented. For example, in some embodiments, display 500 may include a track bar, which indicates the position in the play length of the media playlist (e.g., playlist 502) that the user is currently accessing. Furthermore, in some embodiments, display 500 may indicate the amount of time remaining in the media playlist or in any individual media asset. For example, in some embodiments, display 500 may include a countdown clock/timer or other graphic indicating to a user the amount of time remaining in the playlist or a media asset.

It should be noted that display 500 is illustrative only and some embodiments may feature displays with additional (or less) options and/or features.

Figure 6:
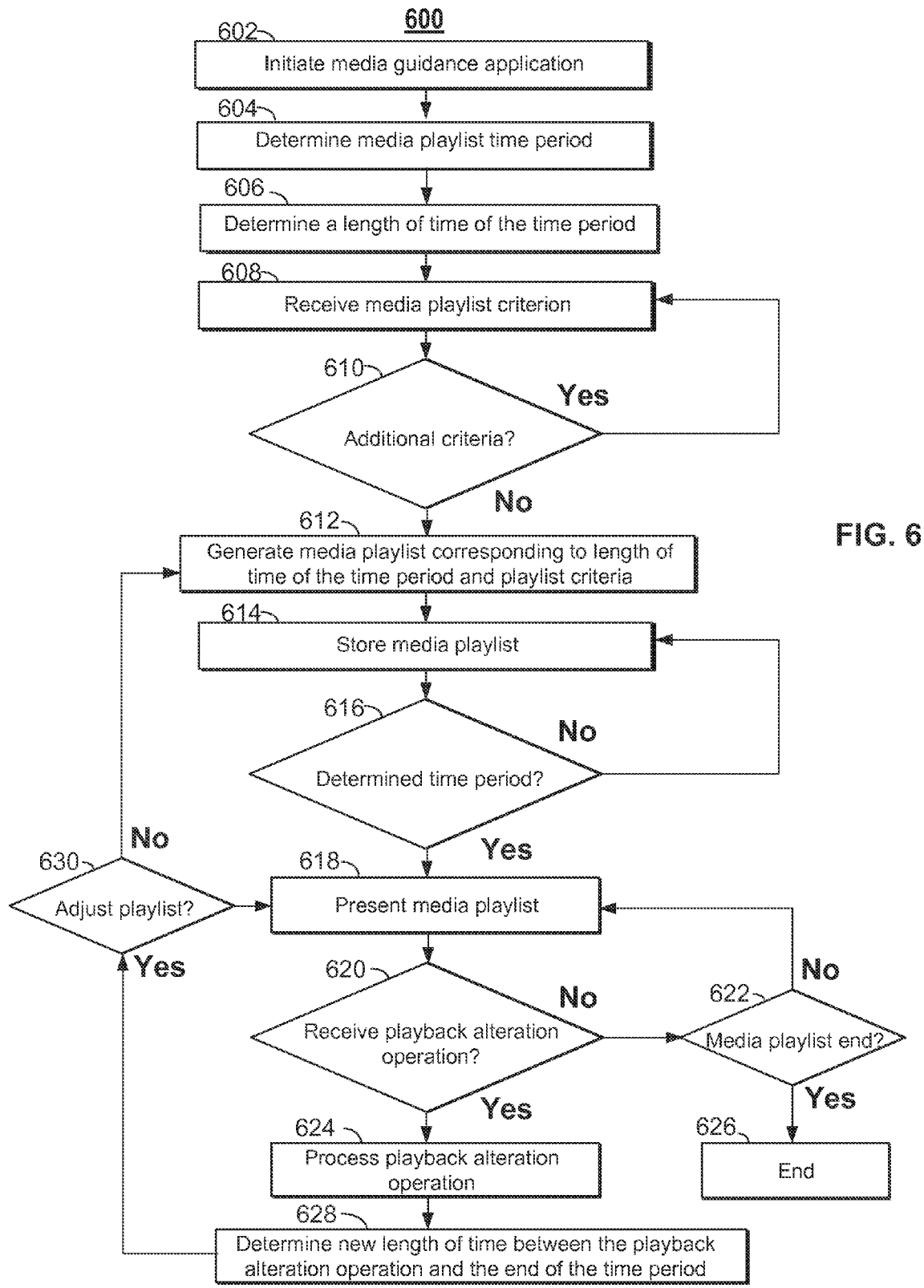
FIG. 6 is a flowchart of illustrative steps for generating and updating media playlists in response to playback alteration operations performed by a user in accordance with some embodiments of the disclosure.

FIG. 6 is a flowchart of illustrative steps for generating and updating media playlists in response to playback alteration operations performed by a user. Process 600 may be used to select a media asset (e.g., media asset 504 of playlist 502 (FIG. 5)) on display device (e.g., display 500 (FIG. 5)). It should be noted that process 600 or any step thereof, could occur on, or be provided by, any of the devices shown in FIGS. 3-4. For example, process 700 may be executed by control circuitry 304 (FIG. 3) as instructed by the media application (e.g., implemented on any of the devices shown and described in FIG. 4).

At step 602, the media guidance application is initiated. For example, in some embodiments the media guidance application may be initiated upon powering on a user device (e.g., user equipment device 402, 404, and/or 406 (FIG. 4)), upon which the media guidance application is implemented. Additionally or alternatively, the media guidance application may be initiated by a user input (e.g., via user input interface 310 (FIG. 3)) selecting selectable option 204 (FIG. 2)).

At step 604, the media guidance application determines a media playlist time period. For example, the media guidance application may receive user inputs (e.g., via input interface 310 (FIG. 3)) of start time option 528 and end time option 530. Alternatively or additionally, the media guidance application may have one or more preset time periods. For example, the media guidance application may include selectable or default option corresponding to a time period beginning with the present time (e.g., as determined by accessing a calendar/clock function incorporated into or accessible to control circuitry 304 (FIG. 3)) and extending for half an hour increments.

At step 606, the media guidance application determines a length of time for the time period. For example, the media guidance application may determine the length of the time period using a suitable mathematical operation (e.g., determining the difference between the start and end time of the time period).

At step 608, the media guidance application receives a media playlist criterion. For example, the media guidance application may receive (e.g., via user input interface 310 (FIG. 3)) a value into criteria option 516 (FIG. 5). Upon receiving a criterion, the media guidance application may proceed to step 610 and determine if there are any additional criteria for the media playlist. If there are additional criteria the media guidance application returns to step 608. If there are no additional criteria, the media guidance application proceeds to step 612.

At step 612, the media guidance application generates a media playlist corresponding to the length of time of the time period and the playlist criteria. For example, in response to receiving user inputs (e.g., via user input interface 310 (FIG. 3)) of criteria options 516, 518, 520, 522, and 524 (FIG. 5) and start time option 528 (FIG. 5) and end time option 530 (FIG. 5), the media guidance application generates (as described in depth in relation to FIG. 7 below) a media playlist (e.g., playlist 502). Generating playlists according to particular criteria, for example, is described in greater detail in Kramer et al., U.S. Patent Application Publication No. 2014/0281972, titled "Methods and Systems for Generating Shaped Playlists," filed Mar. 13, 2013, and Isbell et al., U.S. Patent Application Publication No. 2014/0281971, titled "Methods and Systems for Determining the Objective of Media Playlists," filed Mar. 13, 2013, which are hereby incorporated by reference herein in their entirety.

At step 614, the media guidance application stores the generated media asset. For example, upon generating a media asset corresponding to the length of time of the time period and the playlist criteria of step 612, the media guidance application stores the media playlist and proceeds to step 616. At step 616, the media guidance application determines whether the current time corresponds to the determined time period. If the current time does not correspond to the determined time period, the media guidance application returns to step 614 and continues to store the media playlist (e.g., playlist 502 (FIG. 5)). If the current time does correspond to the determined time period, the media guidance application proceeds to step 618 and present the media playlist.

Figure 7:
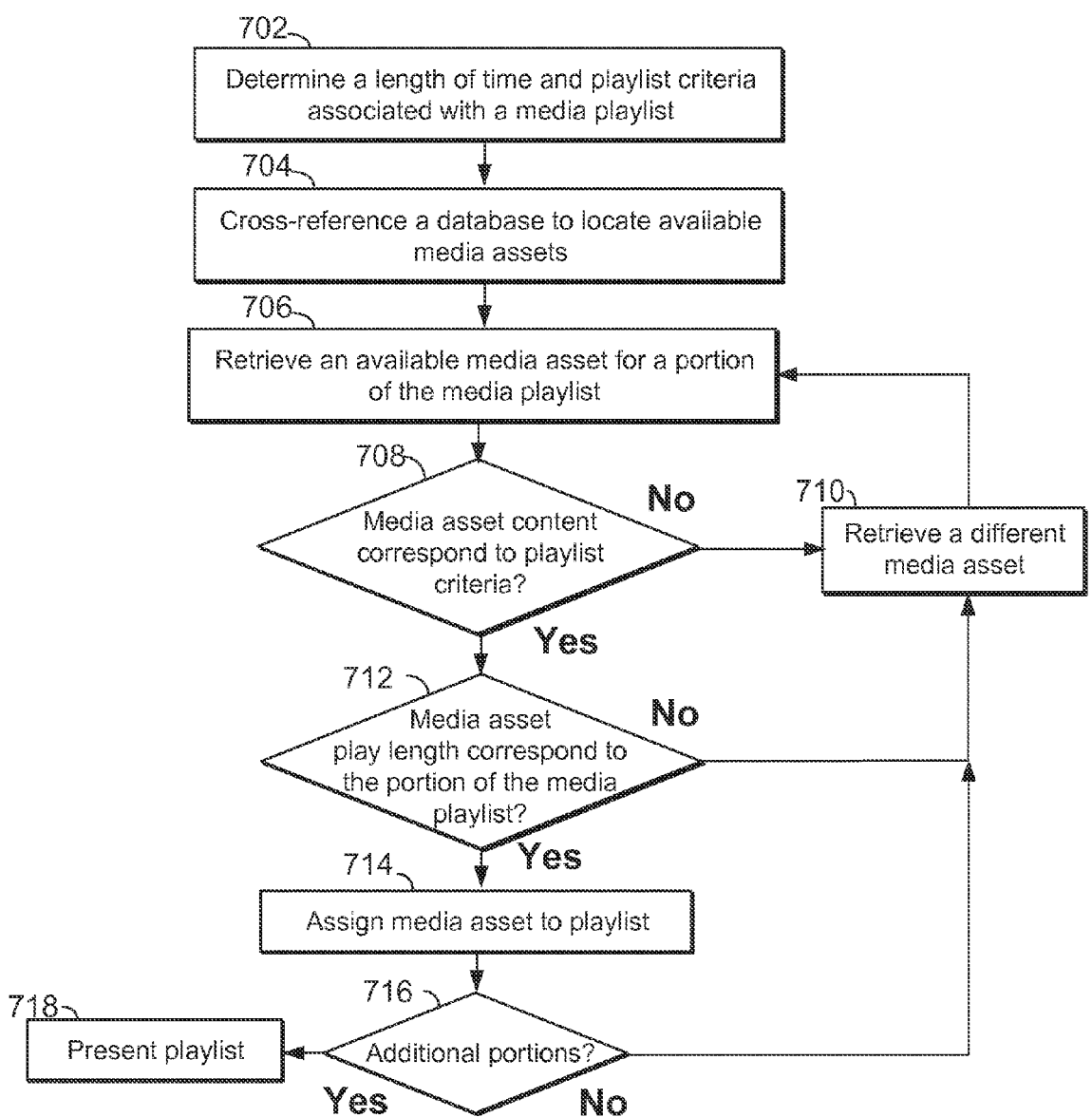
FIG. 7 is a flowchart of illustrative steps for selecting media assets to populate in a media playlist in accordance with some embodiments of the disclosure.

In some embodiments, the media guidance application may test for the determined time period and generate the media playlist only in response to determining the determined time period is within a certain proximity (e.g., five minutes). For example, by delaying the generation of the media playlist until immediately prior to presentation, the media guidance application can ensure the most up-to-date media assets are included in the media playlist. Additionally or alternatively, in some embodiments, the media guidance application may continually update (e.g., via control circuitry 304 (FIG. 3)) the media playlist while the media playlist is stored (e.g., in step 614) to ensure the most up-to-date media assets are included in the media playlist. In some embodiments, continually updating the media playlist may involve continually or periodically cross-referencing a database to locate available media assets as described in step 704 of process 700 (FIG. 7).

At step 620, the media guidance application determines if a playback alteration operation was received. For example, while the media guidance application presents the media playlist (e.g., playlist 502 (FIG. 5)), the user may momentarily pause the playback of the playlist (e.g., to answer the phone, use the bathroom, etc.). If a playback alteration operation was not received, the media guidance application proceeds to step 622.

At step 622, the media guidance application determines if the playback of the media playlist has reached the end of the play length of the media playlist (e.g., corresponding to the end time of the time period). If so, the media guidance application proceeds to step 622 and ends the presentation of the media playlist. If the media guidance application determines the media playlist has not reached its end, the media guidance application returns to step 618 and continues to present the media playlist.

At step 620, if the media guidance application determines that a playback alteration operation was received, the media guidance application proceeds to step 624 and processes the playback alteration operation. For example, if the playback alteration operation is a pause request (e.g., received via a user input interface), the media guidance application (e.g., via control circuitry 304 (FIG. 3)) pauses the playback of the media playlist. If the playback alteration operation is a skip forward request (e.g., received via a user input interface 310 (FIG. 3)), the media guidance application skips ahead in the playback of the media playlist.

At step 628, the media guidance application determines a new length of time between the playback alteration operation and the end of the time period. For example, in response to the playback alteration operation (e.g., pausing playback of the media playlist) during the presentation of the media playlist, the media guidance application may generate a new media playlist with a second play length corresponding to a length of time between a time associated with the completion of the playback alteration operation and an end time of the determined time period. As described below in process 700 (FIG. 7), the new media playlist may add or remove media assets (including cropping or un-cropping media assets), in order to ensure that the end of the media playlist coincides with the end time (e.g., as indicated in end time option 530 (FIG. 5)) of the time period.

In some embodiments, the media guidance application determines the new length of time by determining the difference between the time (e.g., as determined by accessing a calendar/clock function incorporated into or accessible to control circuitry 304 (FIG. 3)) the processing of the playback alteration operation was completed (e.g., time when the media playlist is un-paused following a pause, the time when a fast-forward operation returns to a normal playback mode, etc.) and the end time of the time period.

Upon determining the new length of time between the playback alteration operation and the end of the time period, the media guidance application proceeds to step 630 and determines whether or not to adjust the media playlist based on the new length of time. In some embodiments, the media guidance application may automatically generate (e.g., without further user input) a new media playlist in response to determining the new length of time following the playback alteration operation. For example, automatic generation of new media playlists may be a default or selected option (e.g., featured in display 500 (FIG. 5)).

In some embodiments, the media guidance application may prompt the user that the end of the media playlist no longer coincides with the end time (e.g., as indicated in end time option 530 (FIG. 5)) of the time period. For example, the media guidance application may present a pop-up warning indicating a discrepancy and the amount of time of the discrepancy. The media guidance application may generate several options for the user. For example, the media guidance application may generate options such as generating a new media playlist (e.g., returning to step 612) or maintaining the current media playlist (e.g., returning to step 618. In some embodiments, the media guidance application may generate additional options prompting the user to edit (e.g., crop, remove, add, etc.) the media assets in either the current or new media playlist in order to cure the discrepancy. The media guidance application may also offer further playback alteration operation (e.g., skipping ahead following a pause) in order to cure the discrepancy.

If the media guidance application determines to generate a new media playlist corresponding to the length of time remaining before the end of the time period and based on the previous playlist criteria, the media guidance application returns to step 612. For example, in response to determining that following a pause operation, before which the media playlist had twenty minutes of play length remaining, there is only ten minutes before the end time of the time period, the media guidance application may (e.g., via control circuitry 304 (FIG. 3)) remove and/or crop media assets to reduce the play length of the new media playlist to ten minutes.

In some embodiments, the media guidance application may incorporate additional criteria for selecting media assets in a new media playlist. For example, in some embodiments, when generating a second media playlist, the media guidance application may also base the selection and/or ordering of a media asset for the second playlist on whether or not the media asset was presented in the first media playlist. For example, if a media asset was presented in the first media asset, the media guidance application may not include that media asset in the second media playlist. Alternatively or additionally, if the completion of the playback alteration operation occurred during the playback of a particular media asset in the first media playlist (e.g., a user fast-forwarded to a particular media asset), the second media playlist may include and/or begin with the same media asset. For example, the media guidance application may mark the media assets that were or were not presented in the presentation of the media playlist before the playback alteration operation. When generating the new playlist, the media guidance application may reference the marks on the media assets for selection and/or ordering purposes.

If the media guidance application determines to not generate a new media playlist corresponding to the length of time remaining before the end of the time period and based on the previous playlist criteria, the media guidance application returns to step 618. At step 618, the media guidance application continues the presentation of the original media playlist.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method.

FIG. 7 is a flowchart of illustrative steps for selecting media assets to populate in a media playlist in accordance with some embodiments of the disclosure. Process 700 may be used to select a media asset (e.g., media asset 504 of playlist 502 (FIG. 5)) on display device (e.g., display 500 (FIG. 5)). It should be noted that process 700 or any step thereof, could occur on, or be provided by, any of the devices shown in FIGS. 3-4. For example, process 700 may be executed by control circuitry 304 (FIG. 3) as instructed by the media application (e.g., implemented on any of the devices shown and described in FIG. 4).

At step 702, the media guidance application determines a length of time and playlist criteria associated with a media playlist. For example, in some embodiments, the length of time associated with the media playlist will correspond to the length of time of the time period for presentation of the media playlist. For example, as described above in step 606 of process 600 (FIG. 6)), the media guidance application determines a length of time of the time period (e.g., as designated by a start time option 528 (FIG. 5) and end time option 530 (FIG. 5) in display 500 (FIG. 5)) associated with presenting the media playlist. The media guidance application may then determine a play length of the media playlist that corresponds to the length of the time period.

In addition, in some embodiments, the playlist criteria may be specified by a user input. For example, in response to receiving user inputs (e.g., via user input interface 310 (FIG. 3)) of criteria options 516, 518, 520, 522, and 524, the media guidance application generates a media playlist (e.g., playlist 502).

At step 704, the media guidance application cross-references a database to locate available media assets. For example, the media guidance application may query a database, for example, located locally (e.g., on storage 308 (FIG. 3)) or remotely (e.g., at media content source 416 (FIG. 4) or media guidance data source 418 (FIG. 4)) to determine the pool of media assets from which a media asset may be selected.

At step 706, the media application retrieves an available media asset for a portion of the media playlist. For example, in some embodiments, the media application may perform multiple iterations of process 700, and with each iteration process a different media asset of the available media assets. In some embodiments, the media guidance application may retrieve each media asset of the available media assets in successive iterations. In some embodiments, the media guidance application may retrieve media assets only until all available portions of a media playlist have been assigned as discussed below.

At step 708, the media application determines the content of the retrieved media asset. For example, if a criterion (e.g., as designated by criteria option 516 (FIG. 5)) is "News," the media guidance application may search for media assets with content that corresponds to "News." If so, the media application proceeds to step 712. If not, the media application proceeds to step 710 and retrieves a different media asset because the currently retrieved media asset does not have content corresponding to the criteria of the media playlist.

In some embodiments, to determine whether or not the media asset content corresponds to playlist criteria, the media application may query a database regarding the content of the media asset. For example, each available media asset (e.g., stored in local (e.g., storage 308 (FIG. 3)) or remote (e.g., media content source 416 (FIG. 4) or media guidance data source 418 (FIG. 4) storage) may correspond to information (e.g., a data file) describing the particular content of the media asset. In some embodiments, this information may be received/retrieved from local (e.g., storage 308 (FIG. 3)) or remote (e.g., media content source 416 (FIG. 4) or media guidance data source 418 (FIG. 4)) storage separately or in conjunction with the media asset. Using this information, the media application may determine whether or not the media asset has content corresponding to playlist criteria.

In some embodiments, the media guidance application may use multiple types of optical character recognition and/or fuzzy logic, for example, when comparing multiple data fields (e.g., as contained in the databases described herein). For example, a particular data field cross-referenced by the media guidance application in a database (e.g., located at media guidance data source 418 (FIG. 4)) may be a textual data field. Using fuzzy logic, the system may determine two fields and/or values to be identical even though the substance of the data field or value (e.g., two different spellings) is not identical. In some embodiments, the system may analyze particular data fields of a data structure or media asset frame for particular content, values or text. The data fields could be associated with content, other data, and/or any other information required for the function of the embodiments described herein. Furthermore, the data fields could contain values (e.g., the data fields could be expressed in binary or any other suitable code or programming language).

Additionally or alternatively, the media guidance application may determine the content associated with the media asset by analyzing the media asset. For example, the media guidance application may include multiple content-recognition modules to determine the content of media assets. For example, the media guidance application may include an object recognition module. The object recognition module may use edge detection, pattern recognition, including, but not limited to, self-learning systems (e.g., neural networks), optical character recognition, on-line character recognition (including but not limited to, dynamic character recognition, real-time character recognition, intelligent character recognition), and/or any other suitable technique or method to determine the objects in and/or content of media assets. For example, the media guidance application may receive a media asset in the form of a video. The video may include a series of frames. For each frame of the video, the media guidance application may use an object recognition module to determine the characteristics associated with each frame (or the media assets as a whole) of the video.

In some embodiments, the content-recognition module or algorithm may also include audio analysis and speech recognition techniques, including but not limited to Hidden Markov Models, dynamic time warping, and/or neural networks (as described above) to translate spoken words into text. It should be noted that the content-recognition module may also use other suitable techniques for processing audio and/or visual data.

At step 712, the media guidance application determines whether or not the play length of the retrieved media asset corresponds to the portion of the media playlist. For example, the media guidance application may require a media asset that has a play length of four minutes (e.g., there is a four minute gap between two previously selected media assets). If the media asset does not correspond to the portion of the media playlist, the media application proceeds to step 710 and selects a different media asset (e.g., retrieved from storage 308 (FIG. 3)). If the media asset does correspond to the portion of the media playlist, the media application proceeds to step 714 and assigns the retrieved media asset to the playlist. In some embodiments, the media application may (e.g., using control circuitry 304 (FIG. 3)) crop or extend (e.g., repeat a portion of) a media asset in order to facilitate inclusion of the retrieved media asset in the playlist.

At step 716, the media guidance application determines whether or not there are any additional portions in the media playlist. For example, to generate the media playlist, the media guidance application may (e.g., via control circuitry 304 (FIG. 3)), select one or more media assets (e.g., retrieved from a database located locally (e.g., storage 308 (FIG. 3)) or remotely (e.g., media content source 416 (FIG. 4)), in which the sum of the play length for the selected media assets corresponds to the length of time of the time period. For example, the media guidance application may determine that the length of the time period is one hour therefore, the media guidance application may compile a media playlist (featuring one or more media assets) that has a play length of one hour.

If there are more additional portions in the media playlist, the media guidance application returns to step 710 and retrieves a different media asset. If there are no more additional portions in the media playlist, the media application proceeds to step 718 and presents the playlist. In some embodiments, step 718 may correspond to step 618 of process 600 (FIG. 6)).

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted, the systems and/or methods described above may be applied to, or used in accordance with, other systems and/or methods.

What is claimed is:

1. A method for generating media playlists using a media guidance application, the method comprising:
   determining a time period for presenting media to a user;
   generating a first media playlist with a first play length corresponding to a length of time of the determined time period;
   causing the first media playlist to be presented to the user;
   processing a playback alteration operation while the first media playlist is presented to the user, wherein the playback alteration operation alters the first play length;
   in response to completing the playback alteration operation, generating a second media playlist with a second play length corresponding to a length of time between a time associated with the completion of the playback alteration operation and an end time of the determined time period.

2. The method of claim 1, further comprising:
   determining a content criterion; and
   selecting a media asset to be presented during the first media playlist based on content associated with the media asset corresponding to the content criterion.

3. The method of claim 1, wherein generating the first media playlist comprises:
   determining the length of time of the determined time period;
   determining play lengths for each of a plurality of media assets; and
   selecting a subset of the plurality of media assets, wherein a sum of the play lengths associated with each media asset in the subset corresponds to the length of time of the determined time period.

4. The method of claim 1, wherein generating the second media playlist comprises:
   determining the length of time between the time associated with the completion of the playback alteration operation and the end time of the determined time period;
   determining play lengths for each of a plurality of media assets; and
   selecting a subset of the plurality of media assets, wherein a sum of the play lengths associated for each media asset in the subset corresponds to the length of time between the time associated with the completion of the playback alteration operation and the end time of the determined time period.

5. The method of claim 1, wherein the playback alteration operation includes a pause, fast-forward, rewind, skip, chapter selection, segment selection, skip segment, jump segment, next segment, previous segment, skip advertisement, next chapter, or previous chapter operation.

6. The method of claim 1, further comprising:
   determining a media asset of the first media playlist that is being presented at the completion of the playback alteration operation; and
   selecting the media asset for inclusion in the second media playlist.

7. The method of claim 6, wherein the media asset is presented before any other media asset in the second playlist.

8. The method of claim 1, further comprising:
   determining whether a media asset of the first media playlist was not presented before the playback alteration operation was processed; and
   selecting the media asset for inclusion in the second media playlist.

9. The method of claim 1, further comprising:
   determining an order of media assets in the first media playlist that were not presented before the playback alteration operation was processed;
   selecting the media assets for inclusion in the second media playlist in the order; and
   adjusting the order based on the second play length.

10. The method of claim 1, wherein adjusting the order includes adding, removing, or cropping a media asset.

11. A system for generating media playlists using a media guidance application, the system further comprising control circuitry configured to:
    determine a time period for presenting media to a user;
    generate a first media playlist with a first play length corresponding to a length of time of the determined time period;
    cause the first media playlist to be presented to the user;
    process a playback alteration operation while the first media playlist is presented to the user, wherein the playback alteration operation alters the first play length;
    in response to completing the playback alteration operation, generate a second media playlist with a second play length corresponding to a length of time between a time associated with the completion of the playback alteration operation and an end time of the determined time period.

12. The system of claim 11, wherein the control circuitry is further configured to:
    determine a content criterion; and
    select a media asset to be presented during the first media playlist based on content associated with the media asset corresponding to the content criterion.

13. The system of claim 11, wherein generating the first media playlist comprises:
    determining the length of time of the determined time period;
    determining play lengths for each of a plurality of media assets; and
    selecting a subset of the plurality of media assets, wherein a sum of the play lengths associated with each media asset in the subset corresponds to the length of time of the determined time period.

14. The system of claim 11, wherein generating the second media playlist comprises:
    determining the length of time between the time associated with the completion of the playback alteration operation and the end time of the determined time period;
    determining play lengths for each of a plurality of media assets; and
    selecting a subset of the plurality of media assets, wherein a sum of the play lengths associated for each media asset in the subset corresponds to the length of time between the time associated with the completion of the playback alteration operation and the end time of the determined time period.

15. The system of claim 11, wherein the playback alteration operation includes a pause, fast-forward, rewind, skip, chapter selection, segment selection, skip segment, jump segment, next segment, previous segment, skip advertisement, next chapter, or previous chapter operation.

16. The system of claim 11, wherein the control circuitry is further configured to:
    determining a media asset of the first media playlist that is being presented at the completion of the playback alteration operation; and
    selecting the media asset for inclusion in the second media playlist.

17. The system of claim 16, wherein the media asset is presented before any other media asset in the second playlist.

18. The system of claim 11, wherein the control circuitry is further configured to:
   determining whether a media asset of the first media playlist was not presented before the playback alteration operation was processed; and
   selecting the media asset for inclusion in the second media playlist.

19. The system of claim 11, wherein the control circuitry is further configured to:
   determining an order of media assets in the first media playlist that were not presented before the playback alteration operation was processed;
   selecting the media assets for inclusion in the second media playlist in the order; and
   adjusting the order based on the second play length.

20. The system of claim 11, wherein adjusting the order includes adding, removing, or cropping a media asset.

* * * * *